United States Patent [19]

Harrison

[11] 4,294,276

[45] Oct. 13, 1981

[54] WATER SENSITIVE PROBE VALVE FOR USE WITH A GAS LEAK DETECTOR

[76] Inventor: Loren C. Harrison, 8607 Danby Ave., Whittier, Calif. 90606

[21] Appl. No.: 107,151

[22] Filed: Dec. 26, 1979

[51] Int. Cl.³ .............................................. F16K 13/04
[52] U.S. Cl. ..................................... 137/67; 137/550; 73/40.5 R
[58] Field of Search .............. 137/67, 550; 73/40.5 R, 73/23, 421.5 R

[56] References Cited

U.S. PATENT DOCUMENTS

| | | | |
|---|---|---|---|
| 3,078,862 | 2/1963 | Maly | 137/67 |
| 3,266,668 | 8/1966 | Davis | 137/67 X |
| 3,367,503 | 2/1968 | Topol | 137/67 X |
| 3,472,253 | 10/1969 | Herscher | 137/67 |

*Primary Examiner*—Harold W. Weakley
*Attorney, Agent, or Firm*—Christie, Parker & Hale

[57] ABSTRACT

A water sensitive probe valve shuts off upon detecting water to protect a gas leak detector. A barrel and a cap of the probe valve secure together through a coupling ring and house a normally open valve that is spring biased toward a closed position against a seat of the cap. A water soluble band stretched between a hook on the valve and an anchor holds the valve open. The presence of water dissolves the band and frees the valve to close under the bias of the spring against the seat and prevent water from entering and damaging the gas indicator. A lock keeps the valve open during arming with the water soluble band. The anchor valve and lock all mount on the coupling for ease of disassembly for cleaning and arming. A gas duct on the coupling extends out from the body of the coupling to avoid water entering the duct by runoff across a face of the coupling.

13 Claims, 3 Drawing Figures

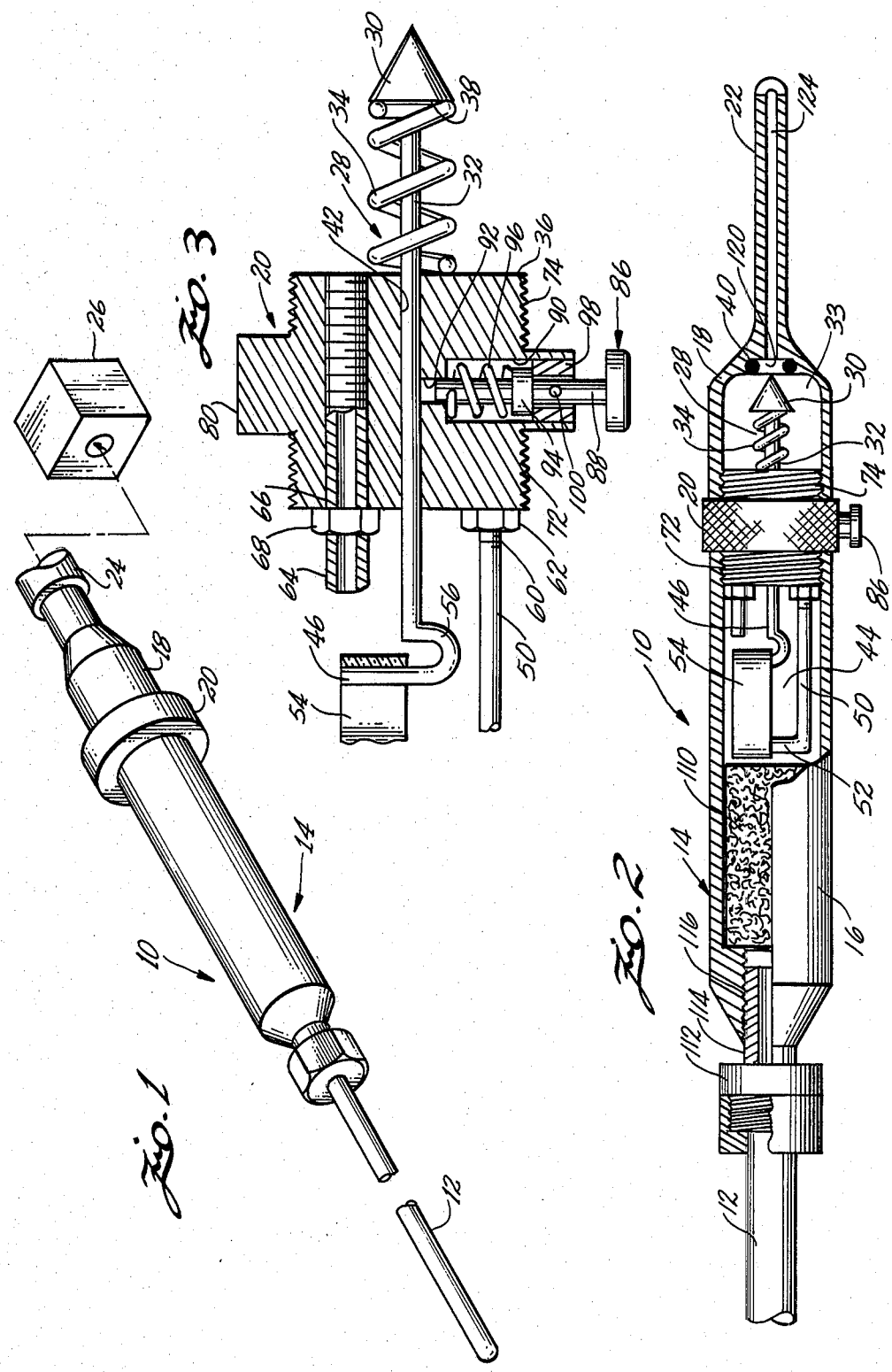

WATER SENSITIVE PROBE VALVE FOR USE WITH A GAS LEAK DETECTOR

BACKGROUND OF THE INVENTION

The present invention relates in general to gas leak detectors, and, in particular, to a water sensitive probe valve that automatically closes a path to a gas indicator upon sensing the presence of water, to thus protect the gas indicator.

Gas leak detectors or gas indicators are used to detect leaks from gas mains and the like. In general, the type of leak detector of concern here has an elongated probe coupled to a gas indicator through a line. Gas passes through the probe and line into a gas indicator. Typically these instruments are hand operated. Water can damage the gas indicator.

Water can be drawn up to the gas indicator through the probe and cause damage.

It is highly desirable, then, to provide some means to prevent water from entering the gas indicator and damaging that indicator.

Water soluble devices have been used as safeties to close a passage when water is present, but those devices are awkward to use and arm.

Gas leak detectors must be periodically serviced to change filters used to protect the gas indicator from particulates. A requirement for disassembly of the gas leak detector for such service should not be hampered by any means to protect the gas indicator from water.

U.S. Pat. No. 3,472,253 discloses a water detector and valve shutoff that uses a spacing element loaded in compression by a valve element. The element fails when soaked in water. A nut must be removed and an entire assembly broken down to rearm the device. U.S. Pat. No. 2,798,503 to Carver et al discloses a tension loaded water soluble link only as a safety shutoff for hot water heaters. The safety is remote from the valve.

SUMMARY OF THE INVENTION

The present invention provides a water sensitive probe valve with means to prevent water from reaching a gas indicator used with the valve. The gas leak detector is characterized by means for mounting a water soluble link that holds a valve normally open against the closing force of some biasing means. The valve is capable of movement in translation between an open and closed position. The link, when dissolved by water, frees the valve to close, interrupting a fluid passage to the gas indicator through the gas leak detector. The link stretches in tension between two mounts in a body of the gas leak detector. These mounts may be fingers. One of these fingers is of the valve itself and the other finger is on an anchor that directly mounts on a coupling. The valve mounts on the coupling. A gas probe mounts on the body, and means for coupling the gas passage to a gas detector downstream of the valve is provided.

Preferably, the body comprises a barrel, the coupling, and a cap. The coupling joins the barrel and the cap. A seat against which the valve seals absent the link is in a rear chamber within the cap. The coupling and the barrel readily detach from one another to permit replacement of the link and the change of any filter used with the gas probe and placed in a forechamber of the barrel ahead of the water soluble link. The coupling's mount of the valve, anchor, and link makes arming of the device easy.

Preferably, a keeper on the coupling can engage the valve to hold it in its open position while rearming the water soluble link or cleaning the probe valve.

In one form the present invention contemplates a water sensitive probe valve for use with a gas leak detector, with the valve having a body constituted of a barrel and a cap secured together through a coupling, as by threaded joints. The coupling mounts a water soluble link and valve assembly. This assembly includes an anchor extending longitudinally of the probe valve into a forechamber defined within the barrel. This anchor bends over at its terminal and free end to define a finger that holds the link at one of its ends. The valve can translate in the coupling. A shank of the valve extends completely through the coupling. A free end of the shank in the forechamber defines a hook that constitutes the other finger for holding the link. A head of the valve and a biasing spring that urges the head of the valve towards a seat at one end of the cap are housed in a rear chamber opposite the forechamber and within the cap. A passage through the cap within an elongated nose of the cap receives a line for the gas indicator. The coupling mounts a lock that holds the valve in the armed position during changes or mounting of the water soluble link, or for any other desired purpose. The fore end of the chamber has means for mounting a gas probe.

These and other features, aspects and advantages of the present invention will become more apparent from the following description, appended claims and drawings.

BRIEF DESCRIPTION OF THE FIGURES

FIG. 1 is a perspective view of the water sensitive probe valve of the present invention showing its coupling to a gas leak detector or gas indicator;

FIG. 2 is a view, partly in half section and partly broken away, of the preferred water sensitive probe valve of the present invention; and FIG. 3 is a view, mostly in half section, showing in detail the coupling, a valve lock, and a portion of a water soluble link assembly of the water sensitive probe valve.

DESCRIPTION OF THE PREFERRED EMBODIMENT

With reference initially to FIG. 1, the water sensitive probe valve of the present invention is shown in general by reference numeral 10. The valve includes a probe 12 mounted to a body 14. The body consists of a forward barrel 16 and a rear cap 18 joined together through a coupling 20. Cap 18 has a small diameter nose 22 extending rearwardly and longitudinally of the probe. A line 24 mounts on nose 22 and extends to a gas leak detector or gas indicator 26. Gas indicator 26 is in gas communication with the free end of probe 12. In use, the water sensitive probe valve is hand-carried and the operator probes for gas leaks. Any gas is indicated by the gas indicator 26.

Gas indicator 26 is susceptible to damage if water is drawn into it. Sometimes it is not possible to know whether the probe is probing water until after damage to the gas indicator has occurred.

The present invention provides an automatic shutoff that prevents water from entering the gas indicator.

With reference to FIGS. 2 and 3, coupling 20 mounts a valve 28. Valve 28 has a head 30 and an elongated shank 32. Head 30 resides in a rear chamber 33 within cap 18. A coil spring 34 bears against an end face 36 of coupling 20 and a shoulder 38 defined by head 30. Spring 34 urges head 30 away from coupling 20 towards a seat 40 of the cap.

Shank 32 extends through an axial bore 42 of coupling 20 and into a forechamber 44 of barrel 16. The end of valve 28 within the forechamber forms a hook-like finger 46. This finger extends radially of the longitudinal axis of the gas leak detector. An anchor 50 secures coupling 20 and extends past the terminal end of valve 28 to bend radially inward to define an anchor finger 52. Finger 52 and finger 46 both lie in the same plane and in a plane containing the longitudinal axis of the gas leak detector. A water soluble link 54 in the form of a band mounts over fingers 52 and 46 to hold valve 28 in an armed position with head 30 off seat 40. The band is loaded in tension by the opposed forces applied by the fingers and introduced through spring 34. When water reaches band 54, the band fails and the valve closes on the seat to prevent water from entering gas indicator 26.

Finger 46 of valve 28 joins shank 32 through a reentrant section 56. The use of the reentrant section provides the opportunity for slipping a water soluble link down on the links so that it is symmetrical with respect to the longitudinal axis of the device to avoid imposition through the link of binding forces between the shank of the valve and the coupling.

Anchor 50 mounts on coupling 20, as through a threaded connection 60 secured by lock nut 62 bearing against the coupling and the flanks of male threads of anchor 50. A gas duct 64 extends longitudinally and away from coupling 20 into forechamber 44, but secures to the coupling through a threaded connection 66 secured by a lock nut 68.

Coupling 20 has a first threaded end 72. Cooperating female threads of barrel 16 at the end of the barrel receive threaded end 72. The coupling also has a second threaded end 74 that cooperates with female threads in an end of cap 18 to secure the cap to the coupling. Coupling 20 has an intermediate section 80 that extends radially outward from the threaded ends of the coupling. This intermediate section may have a knurled outside surface. The intermediate section provides radial surfaces for bearing by barrel and cap. A keeper or lock 86 mounts in intermediate section 80 and is selectively actuatable to keep the valve in armed position even without a link. The lock or keeper has a shank 88 extending into a radial bore 90 within intermediate section 80. Radial bore 90 has a neck 92 that opens into bore 42. A flange 94 extends radially outward with respect to shank 88. A spring 96 between flange 94 and the interior radial end of the enlarged portion of bore 90 biases the keeper or lock radially outward and out of engagement with valve 28. A bushing 98 threads into a threaded section of bore 90 to provide a bearing for flange 94. A cross pin 100 through shank 88 and in a slot in the bushing is capable of bearing on an inside surface of bushing 98 to hold the keeper in place against the valve.

Band 54 may be paper or of any other water soluble material. It must have sufficient dry strength to withstand the force imposed by spring 34.

Barrel 16 contains a standard filter 110 ahead of link 54. Probe 12 secures to barrel 16 through a fitting 112. Fitting 112 mounts on a threaded stub nipple 114. Nipple 114 threads into a threaded bore 116 in the end of barrel 16.

Seat 40 is defined by a counterbore 120 and an O-ring 122 disposed within the counterbore. The counterbore opens into a passage 124 in nose 22. The passage opens into line 24.

When the water sensitive probe valve is used, the occasion can present itelf where probe 12 encounters water. Water will travel through the probe and into barrel 16. Water will dissolve paper band 54 to free the valve and close against seat 40. This prevents water from reaching gas indicator 26.

When the band has to be changed or the device cleaned, an operator merely presses in on lock or keeper 86 so that its shank 88 bears against shank 32 of valve 28. Cross pin 100 is positioned to bear on the inside surface of bushing 98 by twisting the head of the keeper after the valve is positioned for rearming. With the link in place, coupling 20 and barrel 16 are secured together again and the gas leak detector is ready for use. Keeper 86 can then be released. When it is necessary to change filter 110, the keeper again is activated to keep the valve in its open position and protect the link.

The present invention has been described with reference to a preferred embodiment. The spirit and scope of the appended claims should not, however, necessarily be limited to the foregoing description.

What is claimed is:

1. An improved water sensitive probe valve comprising:
   (a) a body defining an interior gas passage for the passage of gas through the probe valve;
   (b) a coupling of the body and detachable from the balance thereof;
   (c) a valve mounted on the coupling for closing the gas passage in a closed position of the valve, the valve being capable of translation along a path with respect to the coupling, the valve having a first finger extending radially of its path of translation;
   (d) an anchor mounted on the coupling and defining a second finger extending radially of the path of translation of the valve;
   (e) the first and second fingers defining mounting means for a water soluble link that keeps the valve in an open position;
   (f) biasing means for urging the valve into the closed position and applying tension to the water soluble link;
   (g) a gas probe mounted on the body; and
   (h) means for coupling the interior gas passage to a gas detector downstream of the valve.

2. The improved water sensitive probe valve claimed in claim 1 wherein the body comprises a barrel, a coupling, and a cap; the barrel and the cap being attached to the coupling; the barrel being detachable from the coupling; the barrel defining a forechamber and the cap defining a rear chamber, which chambers define a part of the interior gas passage; and the first and second fingers being in the forechamber.

3. The improved water sensitive probe valve claimed in claim 2 wherein the valve includes a shank extending through the coupling between the chambers, the first finger being on an end of the shank and being defined by a hook passing transversely of the longitudinal axis of the body.

4. The improved water sensitive probe valve claimed in claim 3 wherein the cap defines a seat bounding the gas passage, the valve having a head that seals against the seat in the closed position of the valve.

5. The improved water sensitive probe valve claimed in claim 4 wherein the biasing means includes a spring between the valve head and the coupling.

6. The improved water sensitive probe valve claimed in claim 3 including a lock mounted on the coupling and selectively engageable with the shank of the valve to keep the valve in the open position without the link.

7. An improved water sensitive probe valve comprising:
(a) a barrel defining a forechamber;
(b) a coupling normally attached to the barrel at an end thereof;
(c) a cap normally attached to the coupling opposite the barrel and defining a rear chamber, a valve seat, and a passage for gas to pass from the rear chamber and out of the water sensitive probe valve to a gas indicator;
(d) a valve mounted on the coupling for translation between an open and a closed position along the longitudinal axis of the water sensitive probe valve, the closed position being against the seat;
(e) means acting on the valve and coupling to bias the valve towards its closed position;
(f) an end of the valve extending into the forechamber and defining a radial finger;
(g) an anchor mounted to the coupling and extending into the forechamber past the valve to define a second radial finger, the radial fingers cooperating to define a mount for a water soluble link;
(h) a water soluble link on the fingers to hold the valve in its open position;
(i) means on the barrel for mounting a gas probe; and
(j) means on the cap for coupling the gas leak detector to a gas indicator.

8. The water sensitive probe valve claimed in claim 7 including keeper means for locking the valve in its open position without the link.

9. The water sensitive probe valve claimed in claim 8 wherein the keeper means includes means for a selective actuation and means to bias the keeper to an inactivated position.

10. The water sensitive probe valve claimed in claim 8 wherein the barrel forechamber is adapted to receive a filter.

11. The water sensitive probe valve claimed in claim 10 wherein the valve includes a conical head and the biasing means includes a coil spring acting between the coupling and the conical head.

12. The water sensitive probe valve claimed in claim 11 wherein the keeper means includes means for a selective actuation and means to bias the keeper to an inactivated position.

13. The water sensitive probe valve claimed in claim 12 wherein the barrel forechamber is adapted to receive a filter.

* * * * *